Sept. 3, 1946.  C. G. VOKES  2,407,194
FILTER
Filed June 8, 1943  3 Sheets-Sheet 1
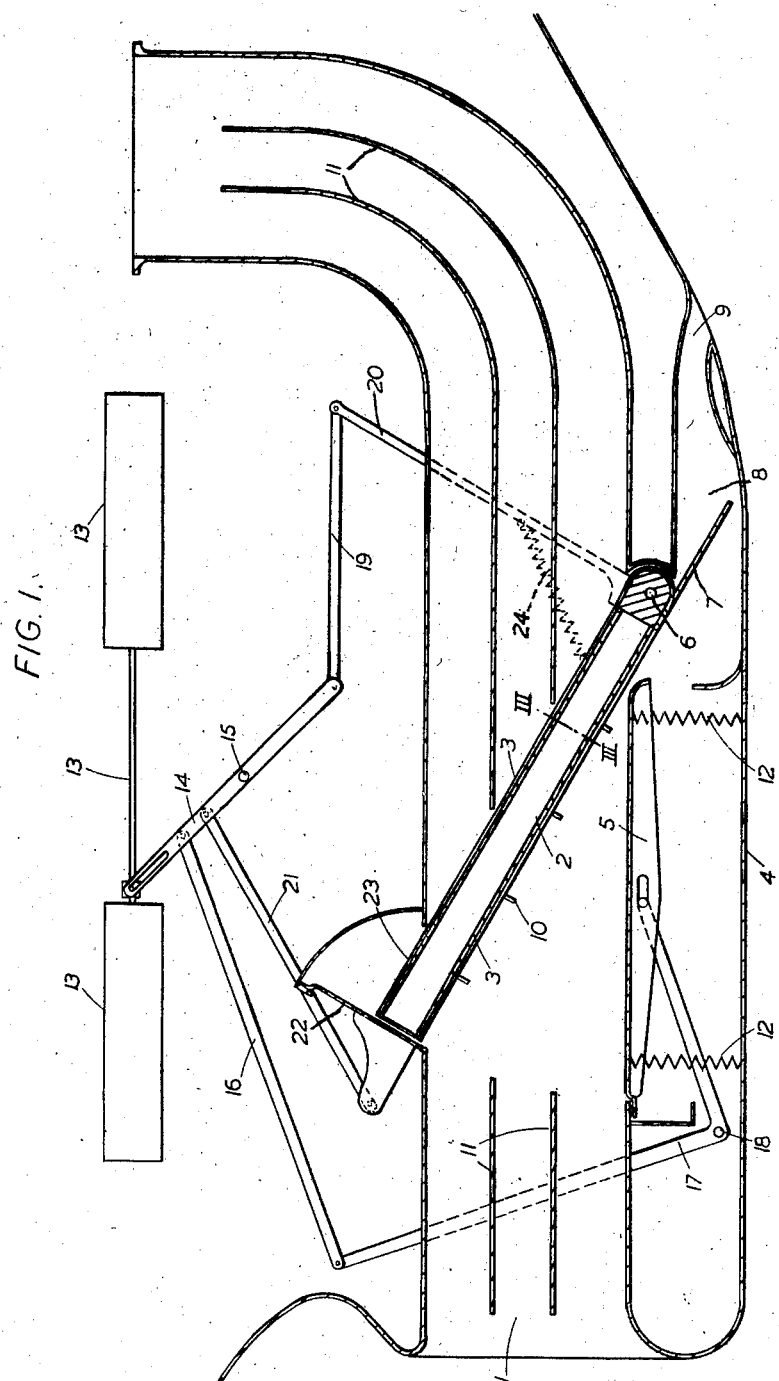
Inventor
Cecil G. Vokes
By
Attorney

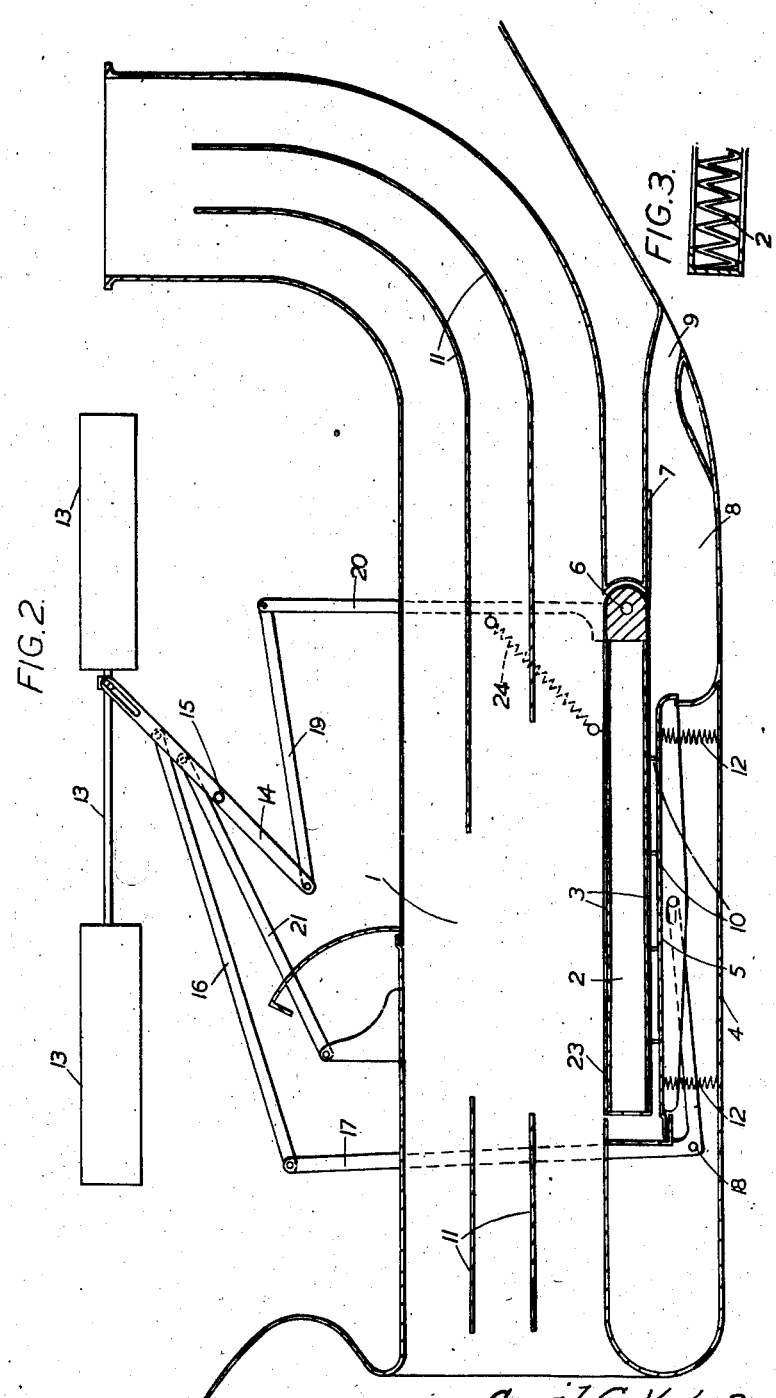

Patented Sept. 3, 1946

2,407,194

UNITED STATES PATENT OFFICE 2,407,194

FILTER

Cecil Gordon Vokes, London, England

Application June 8, 1943, Serial No. 490,067
In Great Britain June 11, 1942

11 Claims. (Cl. 183—33)

This invention is primarily designed for filtering air passing to the engine of aircraft, but it is not necessarily confined thereto, parts of the invention being of wide application where conditions are appropriate to their use.

It is often desirable to cut out a filter temporarily. For example, it may be desired to filter the air passing to an aircraft engine when taking off or landing or at low altitudes but to leave the intake free while actually flying or when flying at higher altitudes.

The present invention provides a method of filtering air supplied to the engine of an aircraft in which the air is drawn to the engine intake through filtering means when the aircraft is on the ground with the engine running and a passage for its direct entry is opened under predetermined flying conditions, a flow through the filtering means being simultaneously induced in the reverse direction so as to dislodge accumulated particles.

Accordingly, in an aircraft having an engine filtering means including a duct structure and a filtering screen, an element of the filtering means is made movable in door-like fashion, the said element controlling air entering the structure by causing it when in the one position to pass through filtering means to the air intake of the engine and when in another position causing it to pass direct to the said air intake without filtration and a small proportion to pass through the filtering means in reverse direction and dislodge accumulated particles.

In a typical form a filtering unit is so mounted at an incline in the filter casing or duct that it will normally be largely self-cleaning and so that it can be moved out of the path of the incoming air either at will or automatically under predetermined conditions. Its control could, for example, be linked with that of a supercharger or that of a retractable under carriage. The present invention has as one important part the fact that the arrangement is such as to take advantage of the movement of the filter unit to produce a reverse flow through the material of the filter screen when the filter is cut out and to discharge the particles or dirt thereby removed.

Other parts of the invention are embodied in typical forms shown upon the accompanying drawings, the parts for which a monopoly is desired being those delimited by the claims.

In the drawings:

Fig. 1 is a sectional elevation of an intake arrangement,

Fig. 2 is a similar view to Fig. 1 showing the parts in an alternative position, Fig. 3 is a fragmentary section on the line III—III of Fig. 1, Figs. 4 and 5 are corresponding views to Figs. 1 and 2 of an alternative form.

Figure 4:
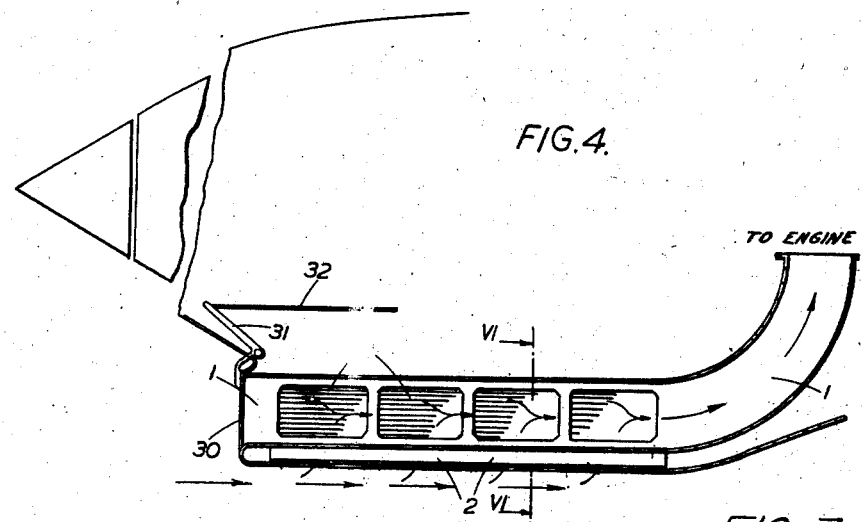
Figure 7:
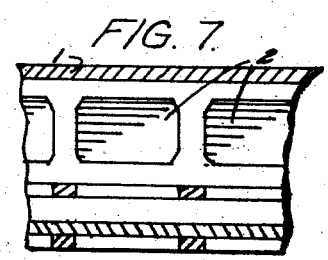
Fig. 7 is an enlarged detail of a portion of Fig. 5.

As shown in Figs. 1, 2 and 3, the filter unit lies in a scoop or other entry duct 1 arranged to admit air from outside the surface skin of an engine cowling or wing or other suitable part of an aircraft. The filter unit may include a filtering element 2 (for example a pleated filtering screen) mounted in a frame 3 which normally extends at an incline across the duct 1. The entry scoop (where such is used) for an up-draught type of engine inlet may, for example, have a base portion 4 covered by a false bottom 5 which extends back nearly to the trailing edge of the frame 3 of the unit. The frame is pivotally mounted at 6 and when in use lies at an upward and forward incline as shown at Fig. 1. An extension 7 on the frame of the unit can close or nearly close the passage 8 in the base portion which leads to opening 9. A small leakage will normally take place past the extension 7, so that a certain amount of dirt from the filter collecting in front of it can pass through and emerge from the exit 9 into the outer air.

Distance pieces or studs 10 are formed under the frame 3 and when the unit is moved down to occupy the top of the base portion, the false bottom 5 moves down beneath it, as shown in Fig. 2. The exit 9 into the outer air is arranged to help induce air flow through the element from the clean side (which now faces the interior of the duct 1) so as to remove adherent dust and grit from the dirty side and discharge it. Air stream separating vanes 11 or air straightening means may be permanently fixed in the duct. The false bottom will again rise into position and give a smooth path to the air flow when the unit is returned to working position. It might be merely spring loaded as by springs 12 to allow of its movement into the base portion and automatic return; or it could be mechanically moved to conform to the movement of the unit. As shown, operating means 13 (which may be electric, hydraulic or pneumatic of conventional form) operates a lever 14 pivoted at 15. A link 16 operates a bell-crank lever 17 pivoted at 18 to control the false bottom; link 19 and arm 20 attached to the filter unit operate the latter; and a link 21 operates a flap 22 in the upper wall of the duct 1, enabling the full area of the front of the filtering element to be used in the position of Fig. 1. The back of the frame is closed at 23 to seal off the aperture when the flap 22 is in the position shown in that figure.

It will be noticed that the dirty side will not be able to contaminate the clean air side and that the forward speed of the machine will create a pressure at the mouth of the air scoop or duct and air will be able to blow through the element in the reverse direction and thereby automatically clean it.

Back fire sometimes damages the elements and arrangements could be made, therefore, for the unit or some part of it to depress in case of a bad back fire, against a spring loading or other means, so as to give free exit to the back fire gases. This is shown as illustrated by the pivoting of both the frame 3 and arms 20 on the axis 6 and the use of springs 24 to hold the frame normally against the abutment on the arm.

Such arrangements are further examples of a door-like use of an element carrying the filtering screen, and any suitable pivoted, sliding or rotating single or multiple door-like movement can be equally readily applied to such an element.

Figure 5:
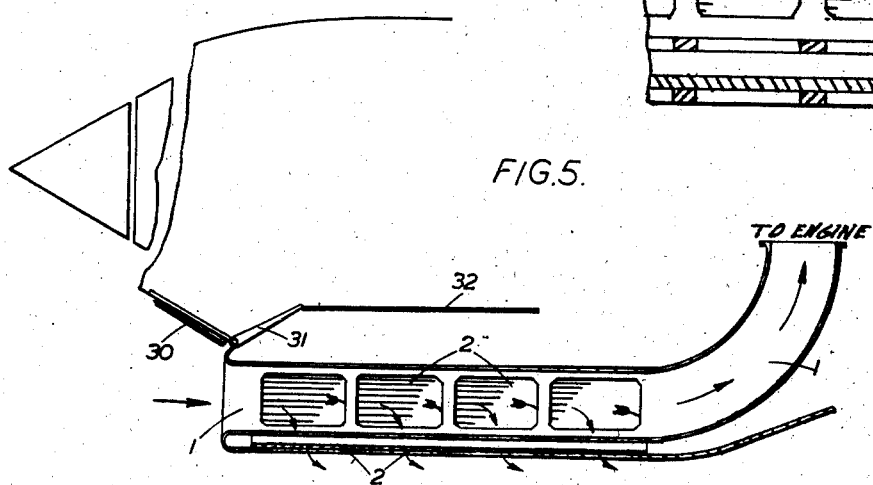
Figure 6:
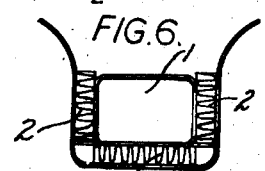
Fig. 6 is a fragmentary section on line VI—VI of Fig. 4.

Turning now to Figs. 4 to 6, the intake duct 1 has panels including filtering screens 2. In this case there are alternative intakes to the duct, namely through the filtering screens 2 and by the front or scoop entry controlled by the movable element 30. This element takes the form of a flap with an arm 31 connected to conventional control means by link 32.

It will be clear that with the flap 30 closed as shown in Fig. 4, the air to be supplied to the engine is drawn through side and bottom openings immediately beyond the filters 2, see Fig. 6, and through the filters and aligned openings in the wall of the duct 1 for delivery of filtered air to the engine. When the flap 30 is open, as shown in Fig. 5, the intake of the duct 1 initially receives the air under the pressure incident to the forward travel of the aeroplane. Therefore, this air stream is fed directly through the duct 1, free of any direct influence of the filtering elements 2. The air passing through the duct 1 under these conditions will in part find its way laterally through the filters 2 incident to the eduction effect of the air flowing longitudinally of the skin beyond the filters relative to the duct. This will cause a small portion of the air from the duct to be deflected laterally of the filters, to pass through the filters in a direction the reverse of the air movement when passing through said filters for filtering, as when the duct intake flap 30 is closed. This reverse flow of air and pressure through the filters tends to clean them for the purpose more particularly described in connection with Fig. 1.

I claim:

1. In an aircraft having an engine, a duct for delivering air to the engine, filtering means selectively functioning at will to filter the air passing through said duct to the engine or to permit the air passing through the duct to the engine to be free of filtration, manually controlled mechanism for said filtering means to cause the air passing through the duct to the engine to remain unfiltered, and means to utilize a portion of the air flowing through the duct in unfiltered condition as a pressure medium to pass through the filtering means in a direction reverse to the direction of the air therethrough during its filtering function, whereby such reversely directed current of air tends to clean the filter.

2. A construction as defined in claim 1, wherein the filter cleaning air is directed for discharge fully beyond the stream of air passing through the duct to the engine.

3. In an aircraft having an engine, a filtering assembly including a duct and a filtering screen, means for causing the flow of air through the duct to selectively and at will, pass through the filtering screen for filtering or, in main part, to pass through the duct free of the influence of the filtering screen, the filtering screen when in non-filtering position with respect to the duct causing a portion of the air passing through the duct, to be directed through the filtering screen in a direction reverse to the flow of air through that screen during the filtering function, whereby the filtering screen is cleaned.

4. A construction as defined in claim 3 wherein a discharge passage is provided for the cleaning air passing in a reverse direction through the filtering screen to avoid influencing the stream of air passing through the duct to the engine.

5. In an aircraft having an engine, a duct for supplying air under pressure to the engine, a filtering element mounted for movement with respect to the duct, said element in one position traversing the duct to filter the air passing therethrough and in another position being free of filtering influence on the air passing through the duct, the filtering element in the latter position presenting its reverse filtering side to the air passing through the duct and a discharge channel below and open to the filtering element when in non-filtering position, whereby when the filtering element is in non-filtering position a portion of the air flowing through the duct is moved in reverse filtering direction through the filtering element to the discharge channel.

6. A construction as defined in claim 5, wherein the duct wall is formed with an opening to receive the filtering element in non-filtering position and wherein a member displaceable by the filtering element when moved to non-filtering position will establish communication between the duct and the discharge channel through the filtering element.

7. A construction as defined in claim 5, wherein means are provided to normally close the duct against the discharge element and wherein the filtering element when moved to non-filtering position, displaces said closing means.

8. A construction as defined in claim 5, wherein the filtering element is provided with an extension to partly bridge the discharge channel when the filtering element is in filtering position.

9. In an aircraft having an engine, a duct having an intake opening facing in the direction of aeroplane travel to direct air to the engine, manually operable means for closing the intake opening of the duct, filtering elements arranged immediately beyond the walls of the duct, the duct being open to the air passing through the filtering elements, and means beyond the filtering elements forming filter inlets for air to be passed through the filtering elements and to the duct, whereby when the means controlling the intake of the duct is closed, the air passing through the duct is delivered through the filtering inlets and when the intake controlling means is open, the air passing through the duct is admitted through such intake and passes through the duct substantially free of filtering influence from the filtering elements.

10. A construction as defined in claim 9, whereby when the intake controlling means is open, the air passing longitudinally of the filter inlets incident to the travel of the aeroplane will present an eduction effect through the filter elements to cause a portion of the air passing through the duct to flow in reverse direction through the filtering elements to clean the same.

11. In an aircraft having an engine, a duct having an intake opening facing in the direction of the travel of the aeroplane, a skin section conforming in part to the walls of the duct and spaced from said walls, filtering elements arranged between the skin section and adjacent wall of the duct, the skin section and adjacent wall of the duct being formed with openings to permit air to flow through the filtering elements and into the duct, and a manually operable flap for closing the intake opening of the duct at will.

CECIL GORDON VOKES.